United States Patent
Campbell et al.

(10) Patent No.: US 7,636,658 B2
(45) Date of Patent: Dec. 22, 2009

(54) DIGITAL MEMO RECORDER HAVING REMOVABLE MEMORY UNIT FOR VEHICLE INTERIOR

(75) Inventors: Douglas C. Campbell, Northville, MI (US); Mark L. Zeinstra, Holland, MI (US); Joseph W. Strazanac, Holland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 1193 days.

(21) Appl. No.: 10/380,852

(22) PCT Filed: Sep. 18, 2001

(86) PCT No.: PCT/US01/28900

§ 371 (c)(1),
(2), (4) Date: Mar. 17, 2003

(87) PCT Pub. No.: WO02/22405

PCT Pub. Date: Mar. 21, 2002

(65) Prior Publication Data

US 2004/0022137 A1      Feb. 5, 2004

Related U.S. Application Data

(60) Provisional application No. 60/233,384, filed on Sep. 18, 2000.

(51) Int. Cl.
    *G10L 21/00* (2006.01)
(52) U.S. Cl. ............ 704/201; 704/200; 379/67.1
(58) Field of Classification Search .......... 379/67.1; 704/201, 200
    See application file for complete search history.

(56) References Cited

U.S. PATENT DOCUMENTS

| 4,875,229 | A |   | 10/1989 | Palett et al. |
| 5,170,164 | A | * | 12/1992 | Lewis ................ 340/988 |
| 5,583,935 | A |   | 12/1996 | Dunchock |
| 5,778,063 | A |   | 7/1998  | Dunchock |
| 5,810,420 | A | * | 9/1998  | Welling ............. 296/97.5 |
| 5,844,472 | A | * | 12/1998 | Lee .................... 340/438 |
| 5,898,392 | A |   | 4/1999  | Bambini et al. |
| 5,903,869 | A | * | 5/1999  | Jacobson et al. ..... 704/272 |

(Continued)

FOREIGN PATENT DOCUMENTS

EP    0 851 423 A1    7/1998

(Continued)

OTHER PUBLICATIONS

"Rearview Mirror Wireless Bluetooth Speakerphone," Hammacher Schlemmer, printed from website http://www.hammacher.com on Jan. 16, 2007, 2 pages.

*Primary Examiner*—Daniel D Abebe
(74) *Attorney, Agent, or Firm*—Foley & Lardner LLP

(57) ABSTRACT

A digital memo recorder for a vehicle interior is disclosed. The digital memo recorder includes a digital audio recorder coupleable to an accessory unit of the vehicle interior. The digital audio recorder is configured to receive audible sounds from the vehicle interior. The digital memo recorder further includes a memory interface configured to receive a removable memory unit. The digital audio recorder is configured to digitize the audible sounds and to store the digitized data on the removable memory unit.

25 Claims, 3 Drawing Sheets

U.S. PATENT DOCUMENTS

| | | | |
|---|---|---|---|
| 6,021,325 A * | 2/2000 | Hall | 455/412.1 |
| 6,038,199 A * | 3/2000 | Pawlowski et al. | 369/29.02 |
| 6,282,154 B1 * | 8/2001 | Webb | 704/275 |
| 6,327,633 B1 * | 12/2001 | Chawla et al. | 710/62 |
| 6,694,126 B1 | 2/2004 | Van Lente | |
| 6,941,180 B1 * | 9/2005 | Fischer et al. | 700/94 |
| 7,257,426 B1 | 8/2007 | Witkowski et al. | |
| 7,346,374 B2 | 3/2008 | Witkowski et al. | |
| 7,349,722 B2 | 3/2008 | Witkowski et al. | |
| 2004/0051337 A1 | 3/2004 | Eich | |
| 2004/0057562 A1 * | 3/2004 | Myers et al. | 379/88.14 |
| 2008/0045274 A1 | 2/2008 | Witkowski et al. | |
| 2008/0161047 A1 | 7/2008 | Witkowski et al. | |

FOREIGN PATENT DOCUMENTS

| | | |
|---|---|---|
| JP | 07 014016 | 1/1995 |
| JP | 2000 249569 | 9/2000 |

\* cited by examiner

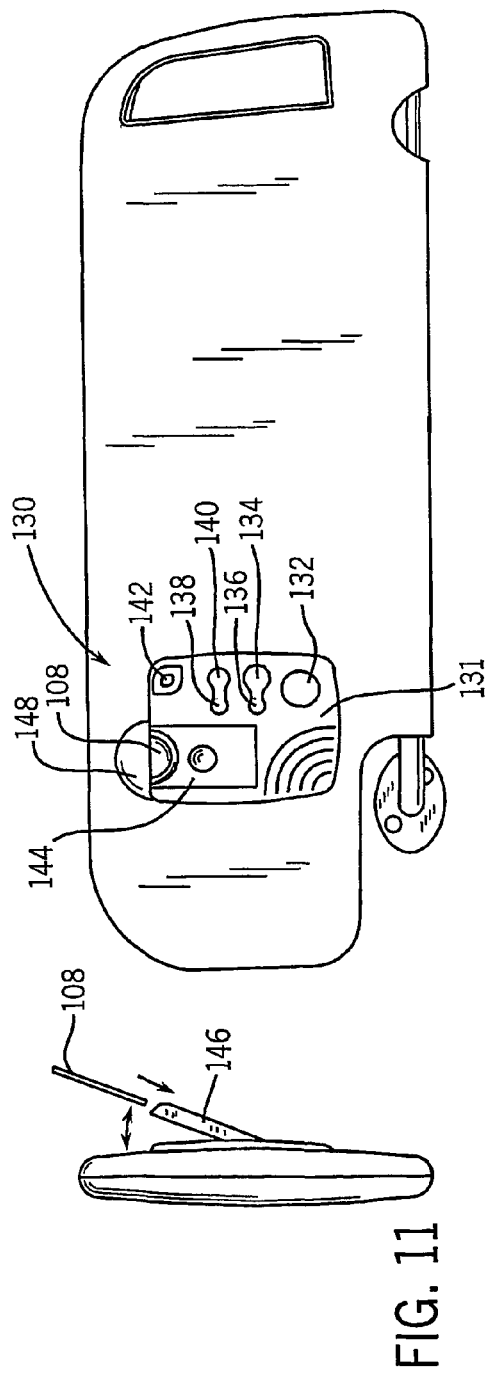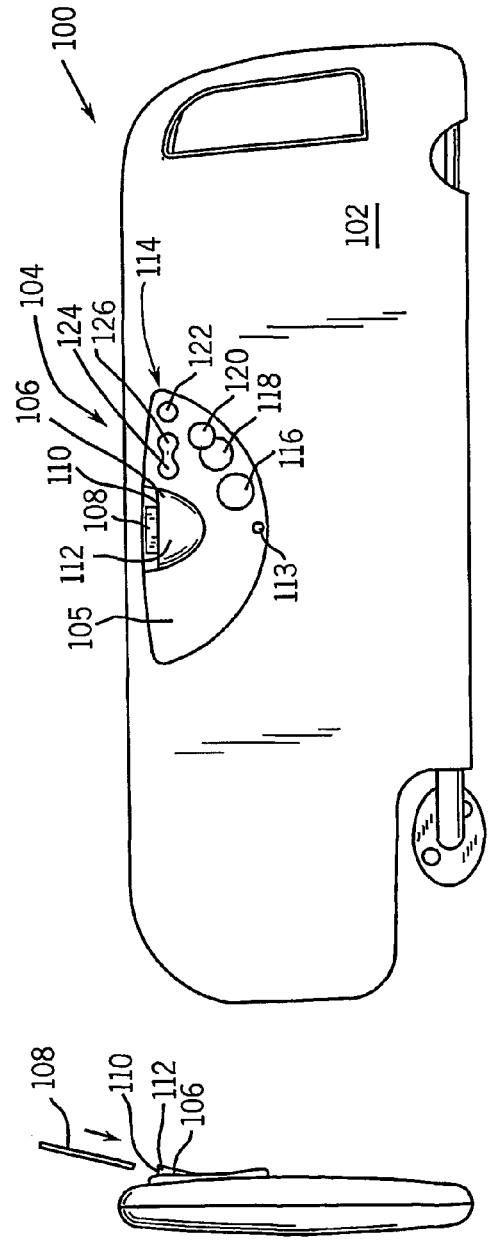

DIGITAL MEMO RECORDER HAVING REMOVABLE MEMORY UNIT FOR VEHICLE INTERIOR

This application claims priority to U.S. Provisional Patent Application Ser. No. 60/233,384, filed Sep. 18, 2000, titled "DIGITAL MEMO RECORDER HAVING REMOVABLE MEMORY UNIT FOR VEHICLE INTERIOR."

FIELD OF THE INVENTION

The present invention relates generally to systems for vehicle interiors. More specifically, the present invention relates to a recording device for a vehicle interior. More specifically yet, the present invention relates to a digital memo recorder having a removable memory unit for a vehicle interior.

BACKGROUND OF THE INVENTION

Typically, when in a vehicle traveling to and from work or if talking on a cellular telephone, errands, appointments, telephone calls, or other chores which require future activity are brought to the attention of or are thought of by the driver. In the past, for recording such items for future reference, a vehicle operator may have carried a memo pad which can be attached to the dashboard and removed for jotting down such items. In some instances, armrest consoles may include built-in memo pads or writing surfaces for listing such items. U.S. Pat. No. 4,875,229 discloses a visor mounted telephone and an analog tape answering and recording machine. Such a device has the usual complicated controls associated with an analog recorder and does not allow random access to a recorded message.

Recently, portable digital recording devices have become available for recording short messages, such as reminder memos to one's self, and can be conveniently carried in a pocket of the user. Although such devices provide a useful function, they can easily be left behind in pockets of clothing not worn or set aside and left in the office or home. Further, they do not allow for random access to any desired message. Also, with traffic increasing and highway speeds rising, fumbling with a pen, paper, or loose communication device can be dangerous.

Furthermore, memo recorders do not provide a user with a convenient way to transfer the recordings to various other devices. Memo recorders do not provide removable memory modules, nor do they allow for the removal, replacement, and interchange of memory modules with the memo recorder. A user may desire to remove or interchange a memory module for use with other devices such as desktop computers, recorders, etc.

Accordingly, it would be advantageous to provide a digital memo recorder having a removable memory unit. It would further be advantageous to provide a digital memo recorder which would provide removable memory modules, as well as facilitate the insertion, removal, replacement, and interchangeability of memory modules. It would further be advantageous to provide a digital memo recorder providing an occupant of a vehicle interior with easy and convenient use of the digital memo recorder.

The teachings herein extend to those embodiments which fall within the scope of the appended claims, regardless of whether they accomplish one or more of the above-mentioned needs.

SUMMARY OF THE INVENTION

One embodiment of the present invention relates to a digital memo recorder for a vehicle interior. The digital memo recorder includes a digital audio recorder coupleable to an accessory unit of the vehicle interior. The digital audio recorder is configured to receive audible sounds from the vehicle interior. The digital memo recorder further includes a memory interface configured to receive a removable memory unit. The digital audio recorder is configured to digitize the audible sounds and to store the digitized data on the removable memory unit.

Another embodiment of the present invention relates to a method of recording digital audio messages in a vehicle interior. The method includes receiving an audio message from within the vehicle, converting the audio message to a digital format, and storing the audio message on a removable memory unit.

Another embodiment of the present invention relates to an accessory unit for the interior of a vehicle. The accessory unit includes an accessory unit base coupleable to the interior of a vehicle, a digital audio recorder coupled to the accessory unit base configured to receive audible sounds from the vehicle interior, and a memory interface configured to receive a removable memory unit. The digital audio recorder is configured to digitize the audible sounds and to store the digitized data on the removable memory unit.

BRIEF DESCRIPTION OF THE DRAWINGS

The invention will become more fully understood from the following detailed description, taken in conjunction with the accompanying drawings, wherein like reference numerals refer to like parts, in which:

FIG. 8 is a perspective view of a visor having a digital memo recorder according to an exemplary embodiment;

FIG. 9 is a side view of the visor of FIG. 8;

FIG. 10 is a perspective view of a visor having a digital memo recorder having an extendable memory interface according to an exemplary embodiment; and FIG. 11 is a side view of the visor of FIG. 10.

DETAILED DESCRIPTION OF THE INVENTION

U.S. Pat. No. 5,810,420 ("Memo Visor"), U.S. Pat. No. 4,227,241 ("Visor Assembly"), and U.S. Pat. No. 5,442,340

("Trainable RF Transmitter Including Attenuation Control") are herein incorporated by reference in their entirety.

Figures 1, 2, 3, 4:
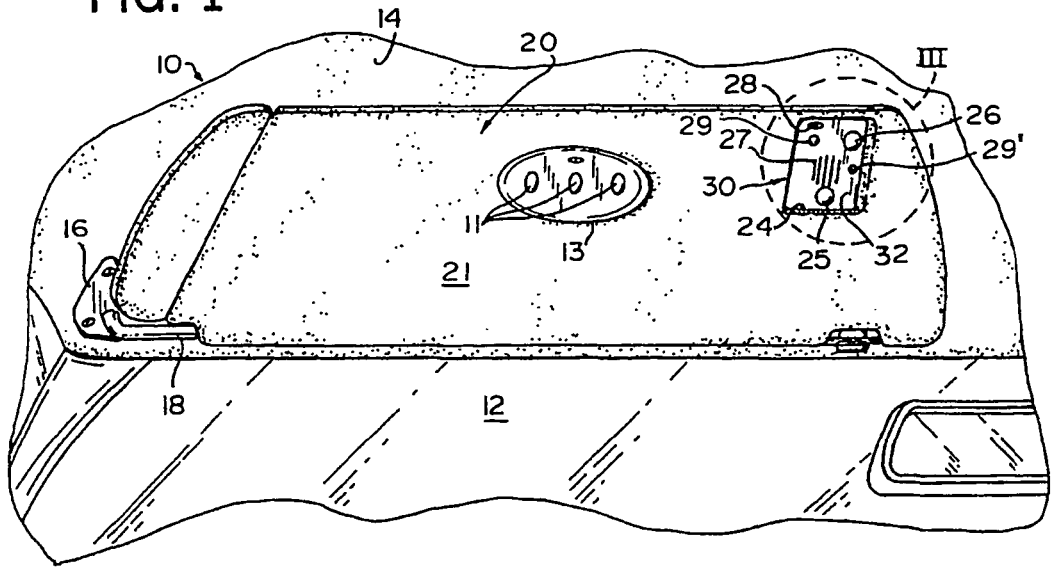
FIG. 1 is a perspective view of a vehicle including a visor incorporating the present invention.
FIG. 2 is a perspective view of the visor shown in FIG. 1, shown in a lowered, sun blocking position.
FIG. 3 is an enlarged, fragmentary, perspective view of a section of the visor shown by detail line III in FIG. 1.
FIG. 4 is a cross-sectional view of the structure shown in FIG. 3 taken along lines IV-IV of FIG. 3.

Referring initially to FIG. 1, there is shown a vehicle 10, such as an automobile, having a windshield 12 above which there is mounted a visor assembly 20 of the present invention. Shown is the driver's side visor which includes a visor body 22 (FIG. 4) which can be of molded polymeric construction having a pair of halves integrally hinged together to form a clam-shell type construction for the body 22. Visor 20 is covered by suitable upholstery material 21 to conform the visor to the interior of the vehicle including, for example, the headliner 14 attached to the vehicle roof. Visor 20 is mounted to the vehicle roof by means of a elbow bracket assembly 16 which can be of conventional design and which includes a visor pivot rod 18 allowing the visor to be moved from a raised, stored position shown in FIG. 1 to a lowered, use position shown in FIG. 2 for providing sun blocking protection. The visor body includes a recess formed in a first side for receiving an illuminated vanity mirror assembly 19 (FIG. 2) which can be of the type disclosed in U.S. Pat. No. 4,227,241 and which includes a cover 17 and an illuminated vanity mirror positioned behind the cover. The cover can be pivoted between the closed position shown in FIG. 2 and an open position exposing the mirror and providing illumination.

The visor body 22 includes a second surface on a side opposite that of the vanity mirror assembly 19 which includes a rectangular recess 24 formed therein for receiving a digital voice recorder 30, as best seen in FIGS. 1, 3, and 4. Recess 24 is formed through one side of the visor core or body 22 and preferably has its peripheral edge covered with the upholstery material 21 to provide a trim appearance to the recess as seen in FIG. 3. Visor 20 further includes a trainable garage door opening transmitter 13 mounted to the visor body 22. Transmitter 13 includes three control switches 11 for operating up to three separate garage doors or other home-based accessories. Transmitter 13 is disclosed in detail in U.S. Pat. No. 5,442,340, the disclosure of which is incorporated herein by reference.

Mounted within the generally rectangular recess 24 of the visor is a digital voice recorder 30 which can be a self-powered, battery-operated device which is commercially available from a number of sources. The digital voice recorder preferably is custom manufactured for the visor and includes a digital voice integrated circuit chip such as an ISD 1000 AP and suitable interface circuitry. In the preferred embodiment of the invention, the digital voice recorder is coupled to the automobile electrical system for receiving operating power. The device has dimensions compatible with the insertion into recess 24 of a visor body since its thickness is less than one-half inch and its rectangular dimensions are approximately two inches by three inches.

The visor body 22 has a recess 24 formed in the upper right-hand corner of the second surface, as seen in FIG. 1, which provides an ideal location for the digital voice recorder 30. Recorder 30 integrally includes a record switch 25, a playback switch 26, a concealed speaker 27, a concealed recording microphone 28, a two-color LED indicator 29 indicating which mode the device is in, and a message delete switch 29. Voice recorder 30 includes these circuit elements mounted in a polymeric housing 32 having a rear surface 34 (FIG. 4) which can be attached to the inner surface 23 of visor core 22 by means of a snap fastener 38 for securing the voice recorder within the recess 24 of the visor body. Other fastening means, such as Velcro®, hook-and-loop fastener or an adhesive, likewise could be employed or the aperture 24 can be dimensioned such that the recorder simply snugly fits therein, although it is preferable to anchor it utilizing a suitable fastener. The recorder may also be removable for replacement of the battery, if the unit is battery powered. Also, the recorder can be designed such that the speaker and microphone are concealed under the visor fabric with only the operating switches and display LED exposed.

To record a message, the record switch 25 is momentarily pressed and the speaker chirps and the two-colored LED 29 illuminates red. The operator then speaks a message, the length of which is limited only by the memory selected for the recorder. After recording a message, the record switch 25 is again momentarily pressed to stop the recording. The speaker chirps and LED 29 turns off.

To play a previously recorded message, the operator momentarily presses the play switch 26, the speaker chirps and the green portion of two-color LED 29 blinks. The first recorded message plays, and the LED turns off. If more than one message has been recorded, the operator again momentarily presses play and repeats the process to play back all of the messages. If no messages remain, pressing the play switch again returns the playback to the first message if the play switch is pressed during message playback, the system skips to next message and begins playback.

To delete a previously recorded message, first the message is played as noted above. The operator, either during playback or immediately following playback, actuates delete switch 29', and a message "Are you sure?" is played. Pressing the delete switch again within 2 seconds deletes the selected message and the recorder plays the message "Message deleted".

Figure 5:
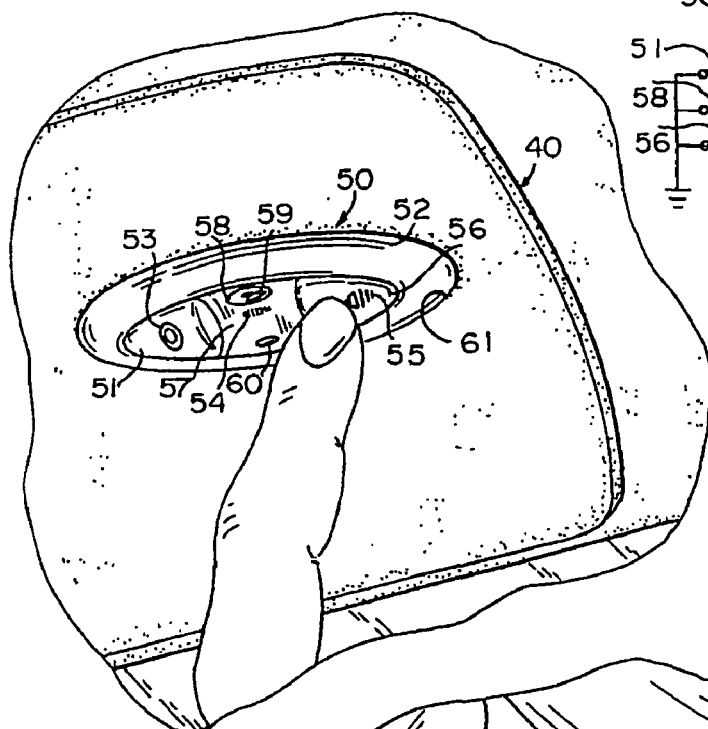
FIG. 5 is a fragmentary perspective view of a visor incorporating a microprocessor controlled digital voice recorder of an alternative embodiment of the present invention.

A digital recording device can be integrated as original equipment within a visor 40, as shown in FIG. 5. Visor 40 includes a digital recording device 50 integrated within the body of the visor and located in the upper right-hand corner of, for example, the driver's side visor illustrated. The digital recording device 50 includes a generally oval bezel 52 for receiving and supporting the user interface controls including a record push-button switch 51, which includes a microphone indicia 53 printed on the face thereof for illustrating to the user that it is the record switch. Also incorporated within the bezel 52 is a center located microphone/speaker 54, which can be a relatively small ceramic device which is commercially available. Further, the bezel supports a playback push-button switch 56 including a speaker indicia 55 thereon for indicating to the user the fact that the switch is for playing back existing messages. The bezel further supports a delete switch 58 having indicia such as a line 59 drawn therein indicating that it is to be used for deleting prerecorded messages. Finally, the bezel 52 supports a multicolored indicator 60 which can be a multicolored LED indicating recording playback and memory status of the device as described below in connection with the device's operation. The bezel 52 can be integrated into an original equipment visor 40 having a folded, butterfly-type core with an oval aperture or recess 61 through one side with the bezel 52 including snap-in tabs for securing the bezel, the switches, LED's and control circuit mounted thereto into the aperture formed in the visor body. If desired, the device 50 can be removably mounted as in the first embodiment.

The bezel provides a neat and trim, relatively compact appearance for the device and one which conforms to the clean appearance of modern vehicles. The push-button control switches can be conventional popple-type switches or other relatively small switches, although it is desirable to have the record and playback switches have a control surface size which is relatively large and significantly larger than the delete switch to provide a convenient control for operation of the digital recording device. Thus, switches 51 and 56 each occupy approximately one-third of the area of the bezel and are significant in size with respect to the bezel. By orienting the switches in a substantially linear fashion within the bezel 52 with the record switch on the left, the play switch spaced apart and on the right with the delete switch centered, an easily remembered tactile control is provided for the digital voice recorder to allow its use without the need for the driver to remove his or her eyes from the road during use. For such purpose also, the center area 57 of the bezel 52 can be recessed in a concave fashion to further tactilely separates switches 51 and 56. The bezel 52 can be made of a suitable polymeric material and colored and textured to conform the device to that of the interior of the vehicle. The switches, LED, speaker/microphone, and other electrical circuitry can be mounted behind the bezel utilizing conventional mounting techniques.

Figure 6:
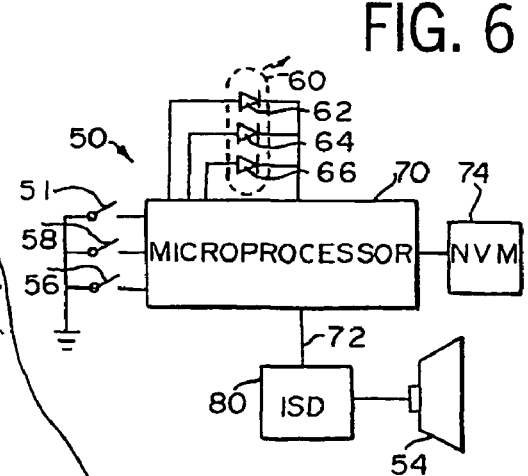
FIG. 6 is an electrical circuit diagram in block and schematic form of the circuit of the device shown in FIG. 5.

The electrical circuit of the digital voice recorder is shown in FIG. 6 and is centered about a microprocessor 70 programmed to facilitate use of the three-button operation of the digital voice recorder. Coupled to the input of microprocessor 70 is the record switch 51, the delete switch 58, and the playback switch 56. Microprocessor 70 is coupled to a digital voice recording chip 80 such as an ISD 1000 AP and for such purpose an address and control line 72 intercouples the microprocessor 70 with the ISD circuit 80. The microprocessor 70 is also coupled to a nonvolatile memory 74 which stores messages received temporarily stored by the ISD circuit 80 and is controlled by the microprocessor 70 to provide random access to such prerecorded, stored messages. The ISD circuit 80 is coupled to the combined microphone/speaker 54 for receiving voice information to be recorded and for playing back such recorded messages.

The microprocessor 70 is also coupled to a three color LED 60, which is shown schematically in FIG. 6, as including a red LED 62 indicating that the device is in a recording mode, a green LED 64 indicating that the device is in a playback mode, and an amber LED 66 providing notification to the user that no messages are recorded when attempting to playback any messages or that the memory is full when attempting to record a message. For such purpose, microprocessor 70 provides a signal to diode 66 which causes it to flash, thereby making it more noticeable.

Microprocessor 70 is programmed to receive inputs from the control switches 51, 58, and 56 and provide output control signals to the LED 60 as well as transfer information from the ISD 80 to the nonvolatile memory 74. The circuit shown in FIG. 6 is powered utilizing conventional power supply circuitry and is coupled to the battery supply line of the vehicle with the nonvolatile memory 74 serving to retain the messages in memory even if the battery supply line is disconnected either inadvertently or, as in some vehicle models, after a predetermined period of time. The microprocessor thus routes messages from the ISD recorder, to the nonvolatile memory and identifies repeated actuation of switch 51 to automatically skip to the message location corresponding to the number of actuations of switch 56. Thus, if the operator wishes to skip the first three stored messages, the operator actuates push-button switch 56 four times, with the four pulses being recognized by the microprocessor to address the nonvolatile memory to retrieve and playback through the ISD 80 the fourth recorded message. In this matter, a relatively easily used three-button control system can be employed to provide random access to stored messages which otherwise is not easily available through either analog devices or previously known portable digital devices.

Microprocessor 70 is also programmed to recognize the actuation of record switch 51 to initiate a recording sequence and actuate LED 62 indicating to the operator that a recording is in process. The microprocessor, at the same time, polls the nonvolatile memory 74 to assure that there remains existent memory for such recording and, in the even that the memory is full, it extinguishes record light 62 indicating to the operator that memory has been exceeded. With the utilization of the nonvolatile memory 74 in connection with the ISD circuit 80, however, a sufficient amount of memory is typically available several messages.

Microprocessor 70 also detects the actuation of the delete switch 58 which, when actuated, will delete a message previously played. Successive actuation of the delete switch 58 will continue deleting messages in descending order. Thus, if the operator has reviewed message twelve and actuates delete switch 58 three times, the microprocessor recognizes the command as deleting messages twelve, eleven and ten and reassigns the memory locations for future messages which are located at the end of the message chain such that the most recently recorded messages will be last in the sequence. The microprocessor, however, can be programmed in any desired manner and such that, when the playback switch is actuated the first time, the earliest or first message is played. In response to such actuation of switch 56, the green light LED 64 will be actuated during the course of the message playback. The microprocessor recognizes the end of the message and discontinues playback upon playback of the first message. Actuating the play switch twice will automatically, as noted above, skip the first message and access the second stored message.

Figure 7:
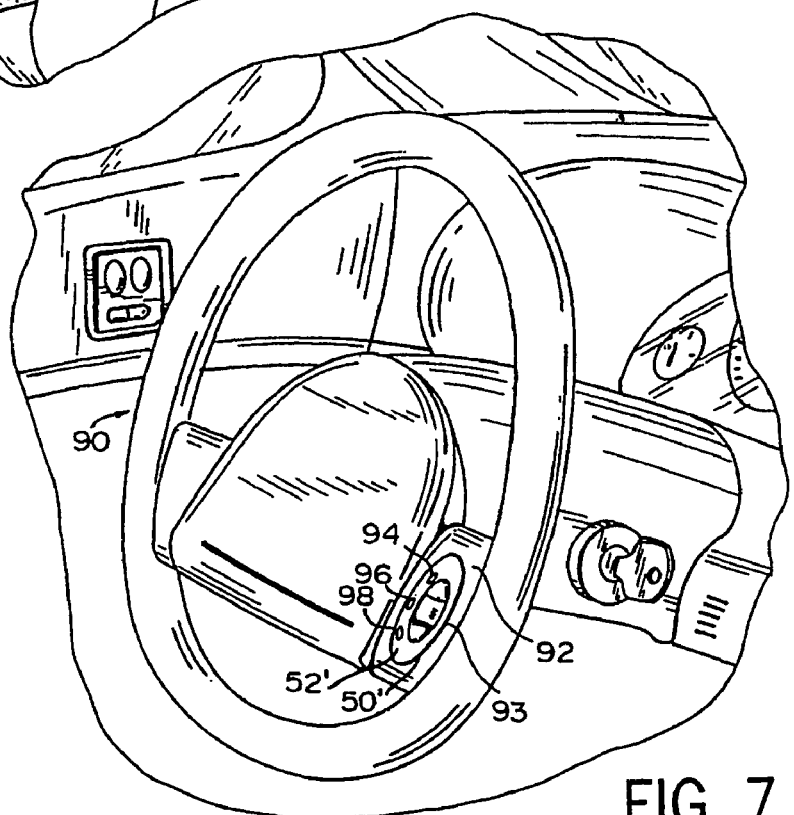
FIG. 7 is a fragmentary perspective view of a visor incorporating yet another embodiment of the present invention.

Although the digital voice recorder 50, shown in FIGS. 5 and 6, is preferably mounted in a visor 40 as shown, which may also include an illuminated vanity mirror assembly such as shown in visor 20 of FIG. 2, recorder 50 could likewise be mounted in the hub of the steering wheel of the vehicle which also provides a convenient location as illustrated in the alternative embodiment of FIG. 7 now described.

Referring now to FIG. 7, a steering wheel 90 is shown which is mounted to a steering column and may include a variety of switches and controls in the wheel as well as an air bag system in its center hub. Mounted in one of the spokes 92 of the wheel 90 to a surface facing the driver is a digital voice recorder 50' of the present invention which includes a bezel 52' incorporating the same voice recorder disclosed in connection with FIGS. 5 and 6 but is somewhat enlarged to include a lower section 93 which includes the now popular HomeLink® trainable transmitter system disclosed in U.S. Pat. No. 5,442,340 referenced above. The HomeLink® trainable transmitter comprises three control switches 94, 96, and 98 which can be actuated to learn and train the frequency and code of up to three existing remote controlled devices, such as existent garage door openers, gate controls or remote light controls. The microprocessor employed in connection with the HomeLink® trainable transmitter can be programmed to include the functions of microprocessor 70 or can be a separate and independent microprocessor if desired.

Referring to FIG. 8, an accessory unit 100 for the interior of a vehicle is shown. Accessory unit 100 is a visor in this exemplary embodiment, but may alternatively include a steering wheel, a dashboard, a car seat, a portion of the interior molding, etc. Preferably, accessory unit 100 is in a position near the mouth or head of at least one passenger of the vehicle to provide optimal sound reception for receiving audible voice sounds. Accessory unit 100 includes an accessory unit base or body 102. Accessory unit 100 may be a TravelNote® accessory, manufactured by Johnson Controls, Inc., Milwaukee, Wis.

A digital memo recorder 104 is coupled to accessory unit base 102. Digital memo recorder 104 has a half-circle-shaped body portion 105 and may be recessed within base 102 or may protrude outward from base 102. Advantageously, recorder 104 is recessed within body 102 to provide a non-intrusive location for the components thereof. Digital memo recorder 104 may include similar components and have similar functionality as digital voice recorder 30 or digital recording device 50, or may include other components or functions. Digital memo recorder 104 is configured to receive audible sounds from the vehicle interior, to digitize the audible sounds, and to store the audible sounds in a memory, as will be described below.

Digital memo recorder 104 further includes operator input devices 114 to allow the operator to control the various functions of digital memo recorder 104. Operator input devices 114 are illustrated as buttons in this exemplary embodiment, but may alternatively include switches, dials, a touch-pad interface, etc., and need not necessarily by physically located on digital memo recorder 104. Further, operator input devices may be configured for voice recognition of simple commands, such as, "Play", "Record", "Next Message", etc., for the operator's improved convenience. Operator input devices 114 include a record button 116 which causes recorder 104 to begin recording audible sounds picked up by a speaker 113, digitizing them, and storing the digitized data in memory as a digital message (e.g., a digital voice memo). A play/start button 118 causes a selected digital message to begin playing from the memory. A stop button 120 causes the playback to stop. A delete button 122 causes the selected message to be deleted. A previous message button 124 causes a previous message to be selected. A next message button 126 causes the next message to be selected. Further, input devices for fast-forwarding and fast-reversing within a digital message may be provided.

A display may be coupled to digital memo recorder 104 to provide visual information to the operator. The display may be, for example, a liquid crystal display (LCD), light-emitting diode display (LED), or other type of display. The display may show any type of visual data, such as a numeral representing the number of the selected digital message, the amount of time (in seconds, minutes, etc.) left in a message being played, the remaining memory (e.g., in MBs, recording time, etc.), or the type of data in the memory. Alternatively, other visual data may be displayed from memory.

Advantageously, digital memo recorder 104 includes a memory interface 106 configured to receive a removable memory unit 108. As illustrated in FIG. 9, memory interface 106 receives removable memory unit 108 into an aperture 110 of a receiving portion 112 of interface 106. Memory interface 106 also includes a connector (not shown) within receiving portion 112 configured to communicate data between removable memory unit 108 and digital memo recorder 104. Removable memory unit 108 may be any type of memory storage medium, such as, flash memory, programmable read-only memory (PROM), electrically erasable programmable read-only memory (EEPROM), magnetic disk or tape, optical memory, or other memory media.

According to one advantageous embodiment, removable memory unit 108 is a memory stick, manufactured by Sony Corp., Tokyo, Japan, and memory interface 106 is configured to receive the memory stick and provide communication between the memory stick and digital memo recorder 104. The memory stick is a flash memory device that is easy to grasp and carry due to its small size (e.g., approximately 1.5 inches long×0.5 inches wide by 2 mils thick), provides a large amount of memory, and provides versatility to allow use with other computing systems, such as home computers, laptops, personal digital assistants, audio devices, etc. The memory stick includes at least 4 MegaBytes (MB) of memory, and may include as much as 16 MB, or up to 128 MB or more. The flash memory is reprogrammable, electrically read/write, and has a fast access time. Exemplary memory stick part numbers include the MSA-64A, MSA-32A, MSA-16A, MSA-8A, and MSA-4A, all manufactured by Sony Corp. Alternatively, flashcards, picture cards, etc., may be used.

The use of a removable memory unit enhances the performance of digital memo recorder 104. The storage capacity and, thus, the recording capacity of recorder 104 is greatly increased by the additional memory and the possibility of using multiple removable memory units. Digital messages may be categorized using different removable memory units for each category.

According to one advantageous feature, one or more digital voice messages are recorded in the vehicle on removable memory unit 108 using digital memo recorder 104. The operator then removes memory unit 108 and inserts the memory unit into another computing device, such as a laptop or desktop computer, either within the vehicle or in the home or office. The computing device includes software configured to convert the digital voice messages into text. One such software application is Dragon NaturallySpeaking Version 5.0, manufactured by Dragon Systems, Inc., Burlington, Mass. Thus, the operator may dictate one or more messages of varying length while operating the vehicle, then have the messages transcribed electronically in the home or office.

According to another advantageous feature, other audio and/or video data (e.g., music, audio books or "books-on-tape", games, words and ideas, photographs, etc.) may be stored on removable memory unit 108 at a computer or other electronic device (e.g., an MP3 player, laptop, etc.) remote from the vehicle. Unit 108 is then transferred to the vehicle for playback in the vehicle via digital memo recorder 104. For example, voicemails or meeting minutes could be stored on removable memory unit 108 and then listened to by the operator in the vehicle using digital memo recorder 104. Advantageously, digital memo recorder 104 may be operated in parallel with any other audio system in the vehicle (e.g., car stereo, CD player, etc.). Thus, digital memo recorder 104 may play back a recorded message, such as, meeting minutes, while the operator is simultaneously listening to music. Upon an important portion of the meeting minutes, the volume of the other audio system can be turned down or off.

According to yet another advantageous feature, digital memo recorder 104 may be used to record a two-way conversation taking place, for example, between two people at different locations in a vehicle, or between one person in the vehicle and one person outside the vehicle, such as, in the house. The two-way conversation may take place via a wired or wireless communication link, and digital memo recorder 104 may be configured to record from the communication link to the removable memory device.

Referring now to FIGS. 10 and 11, a digital memo recorder 130 according to an alternative embodiment is shown. Digital memo recorder 130 includes operator input devices 132, 134, 136, 138, 140, and 142 having similar functionality to those of recorder 104. Digital memo recorder 130 includes a square-shaped body structure 131. Advantageously, a memory interface 144 includes a hinged receiving member 146, illustrated in FIG. 10 in its retracted position and illustrated in FIG. 11 in its extended position. A finger recess 148 provides easy access to allow the operator to unlatch hinged receiving member 146 from its latch (e.g., an interference fit or other latching mechanism). Hinged receiving member 146 provides greater ease in inserting and removing removable memory unit 108.

While the exemplary embodiments illustrated in the FIGS. and described above are presently preferred, it should be understood that these embodiments are offered by way of example only. For example, various other types of digital recording devices may be substituted for that disclosed herein. Further, future improvements in data storage technology will enable additional removable memory types and additional functionalities. Accordingly, the present invention is not limited to a particular embodiment, but extends to various modifications that nevertheless fall within the scope of the appended claims.

What is claimed is:

1. A digital memo recorder for a vehicle interior, comprising:
    a microprocessor at least partially recessed within a vehicle interior element, the microprocessor configured to receive audio from the vehicle interior via a microphone; and
    a memory interface coupled to the vehicle interior element and configured to receive a removable memory unit, wherein the microprocessor configured to digitize the audio and to store the digitized data on the removable memory unit.

2. The digital memo recorder of claim 1, wherein the memory interface is configured to receive a flash memory device.

3. The digital memo recorder of claim 1, further comprising the vehicle interior element and wherein the vehicle interior element is a visor.

4. The digital memo recorder of claim 1, further comprising the vehicle interior element and wherein the vehicle interior is a steering wheel.

5. The digital memo recorder of claim 1, further comprising the removable memory unit.

6. The digital memo recorder of claim 1, wherein the memory interface includes a hinged receiving member movable between a retracted position and a second extended position.

7. The digital memo recorder of claim 1, wherein the microprocessor is configured to receive voice data at the microprocessor from a two-way communication link and to store the voice data on the removable memory unit via the memory interface.

8. The digital memo recorder of claim 1, wherein the microprocessor is configured to receive voice data from a two-way communication link, to store the voice data on the removable memory unit, to record a two-way conversation using the voice data received from the two-way communication link, and to store the two-way conversation on the removable memory unit.

9. A method of recording digital audio messages in a vehicle interior, comprising:
    receiving an audio message from within the vehicle using a microphone coupled to a microprocessor embedded within a vehicle interior element;
    converting the audio message to a digital format using the microprocessor;
    storing the audio message on a removable memory unit communicably coupled to the microprocessor via a memory interface within the vehicle interior element.

10. The method of claim 9, wherein the removable memory unit is a flash memory device.

11. The method of claim 9, further comprising:
    accessing the audio message from the removable memory unit;
    playing the audio message in the vehicle interior;
    receiving voice data at the microprocessor from a two-way communication link; and
    storing the voice data on the removable memory unit;
    wherein the two-way communication link is a wireless communication link.

12. The method of claim 9, further comprising directly accessing one of a plurality of stored audio messages in response to actuation of a user input device.

13. The method of claim 9, further comprising:
    receiving voice data at the microprocessor from a two-way communication link; and
    storing the voice data on the removable memory unit via the memory interface.

14. The method of claim 9, further comprising:
    receiving voice data at the microprocessor from a two-way communication link;
    recording a two-way conversation using the voice data received from the two-way communication link; and
    storing the two-way conversation on the removable memory unit.

15. An accessory unit for the interior of a vehicle, comprising:
    an accessory unit base configured for permanent coupling to the interior of the vehicle;
    a digital audio recorder coupled to the accessory unit base configured to receive audible sounds from the vehicle interior; and
    a memory interface within the accessory unit base and configured to receive a removable memory unit, wherein the digital audio recorder is configured to digitize the audible sounds and to store the digitized data on the removable memory unit.

16. The accessory unit of claim 15, wherein the accessory unit base is part of a visor.

17. The accessory unit of claim 15, wherein the accessory unit base is part of a steering wheel.

18. The accessory unit of claim 15, wherein the accessory unit base is part of a dashboard.

19. The accessory unit of claim 15, wherein the accessory unit base is part of a steering wheel.

20. The accessory unit of claim 15, further comprising a display coupled to the accessory unit base configured to provide visual information to an operator.

21. The accessory unit of claim 15, further comprising an input device configured to control digitizing the audible sounds and storing the digitized data.

22. The accessory unit of claim 15, wherein the accessory unit is at least one of a car seat, a visor, a steering wheel, and a dashboard.

23. The accessory unit of claim 15, wherein the accessory unit is a portion of the interior molding.

24. The accessory unit of claim 15, wherein the digital audio recorder is configured to receive voice data from a two-way communication link and to store the voice data on the removable memory unit via the memory interface.

25. The accessory unit of claim 15, wherein the digital audio recorder is configured to receive voice data from a two-way communication link and to record a two-way conversation using the voice data received from the two-way communication link, and wherein the digital audio recorder is further configured to store the two-way conversation on the removable memory unit via the memory interface.

* * * * *

UNITED STATES PATENT AND TRADEMARK OFFICE
CERTIFICATE OF CORRECTION

PATENT NO. : 7,636,658 B2 Page 1 of 1
APPLICATION NO. : 10/380852
DATED : December 22, 2009
INVENTOR(S) : Campbell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1954 days.

Signed and Sealed this

Ninth Day of November, 2010

David J. Kappos
*Director of the United States Patent and Trademark Office*